Feb. 11, 1930.                 C. HERMANSEN                 1,746,833
                COMBINED PILLOW, SUNSHADE, AND LIFE PRESERVER
                     Filed Dec. 5, 1928        2 Sheets-Sheet 1
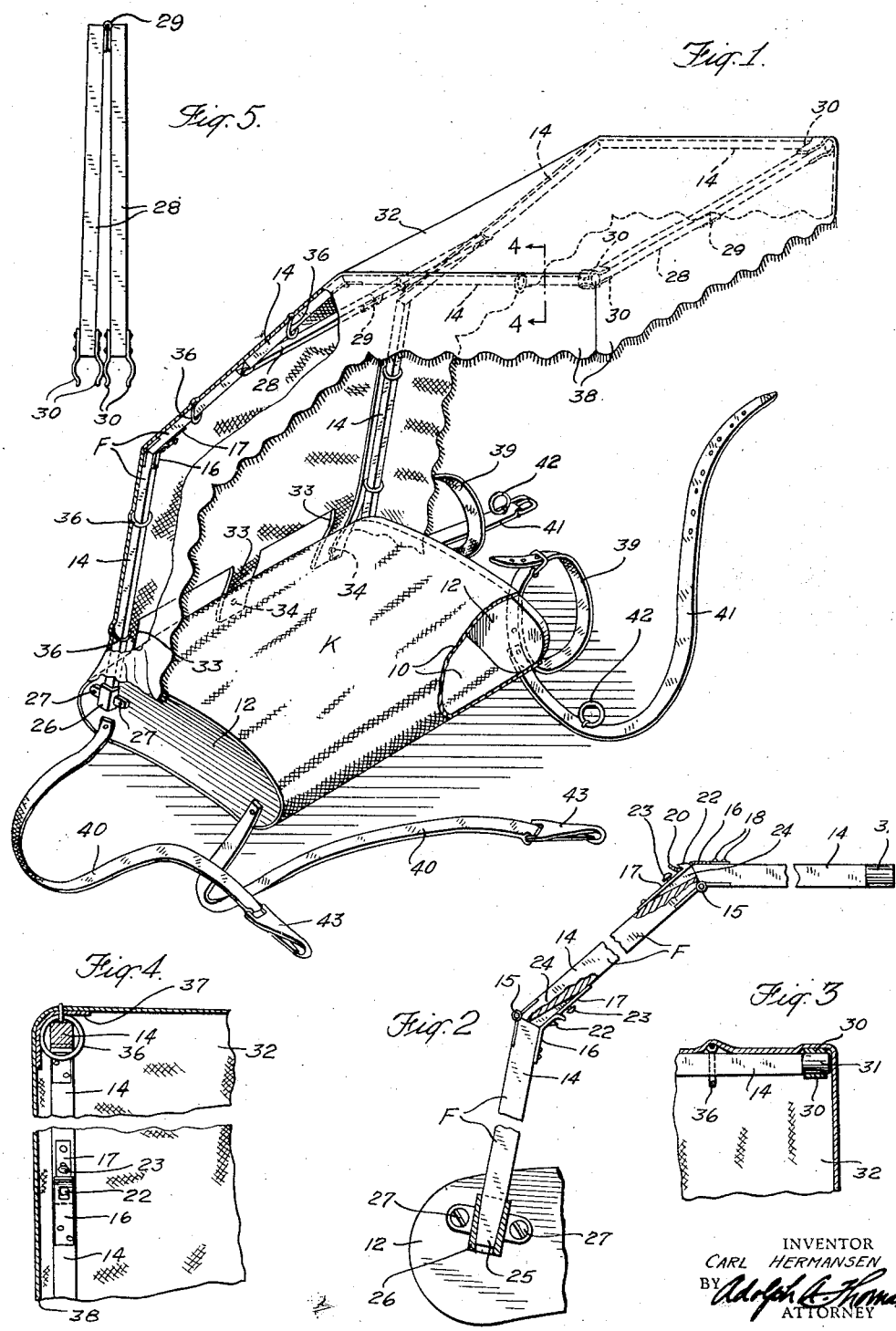
INVENTOR
CARL HERMANSEN
BY
ATTORNEY

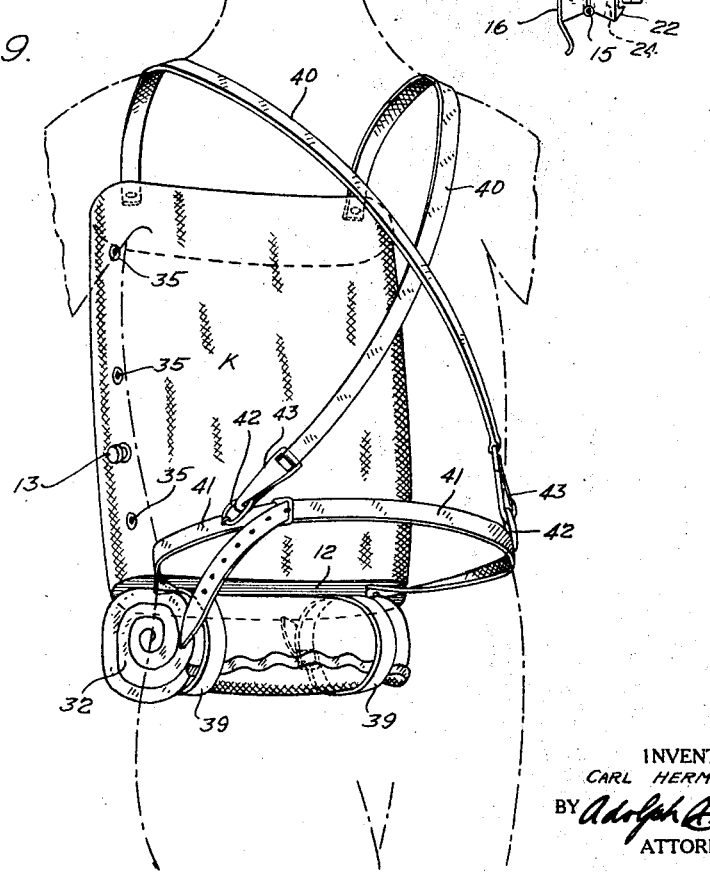

Patented Feb. 11, 1930

1,746,833

UNITED STATES PATENT OFFICE

CARL HERMANSEN, OF ASTORIA, NEW YORK

COMBINED PILLOW, SUNSHADE, AND LIFE PRESERVER

Application filed December 5, 1928. Serial No. 323,832.

My invention is for a novel device which combines the function of pillow, sunshade and life preserver, and is therefore particularly useful at the seashore. The pillow is in the form of a pneumatic cushion or head rest which supports a collapsible frame carrying a shade or small awning. To use this device as a life preserver, the frame is removed from the cushion and folded into the shade, which is rolled up and secured by straps to one end of the pneumatic cushion. The latter may now be fastened to a person's back by suitable straps, so that the inflated cushion acts like a life preserver when the person goes into the water. When the cushion is deflated, the entire device can be made into a very small package that is very light and easily carried about.

A preferred embodiment of my invention is illustrated in the accompanying drawings, in which—

Fig. 1 shows a perspective of my device in set-up condition;

Fig. 2 is an enlarged side view of the shade frame supported by the sides of the cushion, certain parts being broken away for lack of space;

Fig. 3 is a detail view, partly in section, showing a corner portion of the shade and its supporting frame;

Fig. 4 is an enlarged sectional view on line 4—4 of Fig. 1, showing a side portion of the shade and its supporting frame;

Fig. 5 shows one of the bracing rods of the shade frame in folded position;

Fig. 6 is a transverse sectional view showing one of the bracing rods mounted on the frame;

Fig. 7 shows one side of the frame on folded condition;

Fig. 8 is an enlarged detail of the releasable brace at the hinged joints of the rods which form the shade-supporting frame; and Fig. 9 illustrates how the device is attached to a person's back for use as a life preserver.

The pillow or cushion K comprises a body 10 of soft material and a pair of rigid sides 12. The body 10 may be a piece of silk, rubberized cloth or other airtight waterproof material. The sides 12 may be wood, aluminum, or other light strong material, to which the cloth 10 is attached in any practical way, as by gluing or cementing. An air valve 13 permits the cushion K to be inflated and deflated. If desired, a small air pump may be attached to one of the side boards 12 for pumping air into the cushion.

The side boards 12 carry a collapsible frame, indicated as a whole by F, comprising a plurality of rods 14 connected by suitable hinges 15 which permit the rods to be folded against each other, as shown in Fig. 7. To hold the rods in extended or set-up position, as shown in Figs. 1 and 2, I provide releasable braces, which in this instance consist of a flat bar 16 and a movable spring latch 17. The bar 16, which is secured to the rod by screws or rivets 18, has a slot 19 near its curved end 20, as best shown in Fig. 8. The spring blade 17, which is attached to the other bar by one or more screws or rivets 21, terminates in a catch 22. The latch bar 17 may have a pin or button 23 for easily pushing the latch into a recess 24 out of engagement with the locking bar 16. When the folded rods 14 are turned about their hinges 15 into set-up condition, the bevelled catches 22 automatically snap into the slots 19 of the adjacent bars 16, whereby the rods are locked in extended position. In the present embodiment of my invention there are two sets of three connected rods 14 and each set forms a side of the framework F. One rod of each set has a slightly bevelled end 25 adapted to fit into a socket 26 secured to each side 12 of the cushion by screws 27 or otherwise.

The sides of frame F are braced by one or more cross-rods 28, which preferably consist each of two parts hinged at 29, so as to be foldable. A convenient way to attach the cross-rods 28 to the side rods 14 is to provide the former with spring extensions 30 adapted to snap into firm engagement with the side rods. In the present instance I employ two cross-rods 28, one at the front of the frame and another at or near the middle thereof. If the rods 14 are square, they are preferably formed with rounded portions 31 to engage the spring extensions 30 of cross-rods 28, so that the cross-rods are firmly held in position without danger of slipping. This will be clear from Fig. 6. The rods 14 and 28 are preferably of aluminum, or similar material, for strength and lightness.

The collapsible frame F is adapted to support a cover 32, which serves as a sunshade. The lower end of cover 32 may have tabs 33 which carry snap buttons 34 adapted to enter corresponding sockets 35 (see Fig. 9) in cushion K, whereby the shade or cover 32 is easily attached to the cushion. Rings 36 on cover 32 slide over the rods 14 and hold the cover stretched over the frame. I may use strips 37 (see Fig. 4) along the side edges of the cover 32 for re-enforcing the same, particularly if the cover is made of thin material like silk. The cover 32 is preferably provided with a fringe 38, which not only adds to its beauty but also assists in holding the top edge of the cover against the frame F. If necessary or desirable, suitable fastening means (such as strings or tape) may be used to tie the top of the cover to the upper cross-rod 28.

Fig. 1 shows my new device in set-up condition to act as a combined cushion and sunshade. It is a very simple matter to remove the frame F and fold up the rods 14 and 28. These folded rods are placed in the shade or cover 32, whereupon the latter can be rolled up into a small bundle, which is fastened by straps 39 attached to one of the sides 12 of the cushion. The rolled-up or folded condition of the frame F and cover 32 is shown in Fig. 9. When a person wants to use the pneumatic cushion K for a life preserver, he fastens it to his back by means of a pair of shoulder straps 40 and a belt 41. The straps 40 are attached to one of the side pieces 12 and the belt 41 is fastened to the other side piece, which also carries the straps 39. The belt 41 has a pair of rings 42 adapted to receive snap hooks 43 at the ends of the shoulder straps 40.

When the pneumatic cushion K is deflated, the entire device can be made into a very small parcel that is easily accommodated in a small handbag or may even be put in the pocket of a man's coat. Therefore, a person going to the seashore can take my combination outfit with him without the bother of carrying a heavy or awkward bundle. It is only the work of a few moments to set the device up as shown in Fig. 1 for use as a head rest and sunshade on the beach, and with little trouble the device is converted into a life preserver adapted to be strapped on the back as shown in Fig. 9.

Although I have shown and described a specific construction, I want it understood that my invention is not limited to the details set forth. Changes and modifications will probably occur to those skilled in the art without departing from the scope of the invention as defined in the appended claims.

I claim as my invention:

1. A pneumatic cushion having rigid sides, a frame removably supported by said sides, a foldable sunshade mounted on said frame, means whereby said frame is collapsible so that it can be concealed in the folded sunshade, and straps carried by said cushion to fasten the rolled-up shade and frame against one of said sides.

2. A pneumatic cushion substantially rectangular in shape and having rigid side pieces, a frame consisting of collapsible rods which form substantially parallel sides and having at least one cross-piece to brace the side rods, means on said side pieces to receive the lower ends of said rods and thereby support the frame in set-up position, and a cover mounted on said frame to form a shade.

3. A pneumatic cushion having rigid sides, a frame removably supported by said sides, a foldable sunshade mounted on said frame, means whereby said frame is collapsible so that it can be concealed in the folded sunshade, straps carried by said cushion to fasten the rolled-up shade and frame against one of said sides, and additional straps on said cushion to mount the same on the back of a person for use as a life preserver.

4. A unitary device comprising the combination of an inflatable cushion having rigid side pieces, a foldable sunshade attached at its bottom edge to said cushion between said side pieces, a collapsible frame removably supported by the rigid side pieces of the inflated cushion, said sunshade having means for mounting it on said frame, means for securing the sunshade in folded condition to one of said side pieces, and means carried by said cushion to fasten the same and the parts carried thereby as a unit to a person's back.

CARL HERMANSEN.